United States Patent [19]
Stone

[11] Patent Number: 5,206,999
[45] Date of Patent: May 4, 1993

[54] SAW GUIDE AND SURFACE PROTECTOR

[76] Inventor: Tom Stone, 242 Dimmick Ave., Venice, Calif. 90291

[21] Appl. No.: 852,668

[22] Filed: Mar. 17, 1992

[51] Int. Cl.⁵ .................... B23D 47/02; B23D 55/02; B26D 5/02
[52] U.S. Cl. ...................................... 30/372; 30/371; 83/745
[58] Field of Search ................. 30/371, 372, 373, 374, 30/375; 83/745, 746

[56] References Cited

U.S. PATENT DOCUMENTS

| | | | |
|---|---|---|---|
| 3,871,103 | 3/1975 | Simmons | 83/745 |
| 3,903,774 | 9/1975 | Stinson | 30/371 |
| 4,023,273 | 5/1977 | Treleaven | 83/745 |
| 4,131,048 | 12/1978 | Dickes | 83/745 |
| 4,335,512 | 6/1982 | Sheps et al. | 83/745 |
| 4,867,425 | 9/1989 | Miraglia, Jr. | 30/372 |
| 4,919,384 | 4/1990 | Grimberg | 30/372 |

Primary Examiner—Douglas D. Watts
Assistant Examiner—Paul M. Heyrana
Attorney, Agent, or Firm—James E. Brunton

[57] ABSTRACT

A combination saw guide and surface protector which can conveniently be used in the field with a hand operated, power circular saw to make precise cuts in very large sheets of plywood paneling, wallboard and the like. The apparatus includes a surface protector which prevents the soleplate of the saw from engaging and possibly damaging the surface of the workpiece. The apparatus includes two or more sections that can be quickly and easily connected together to enable precision cuts to be made even on very large sheets of paneling and plywood.

11 Claims, 3 Drawing Sheets

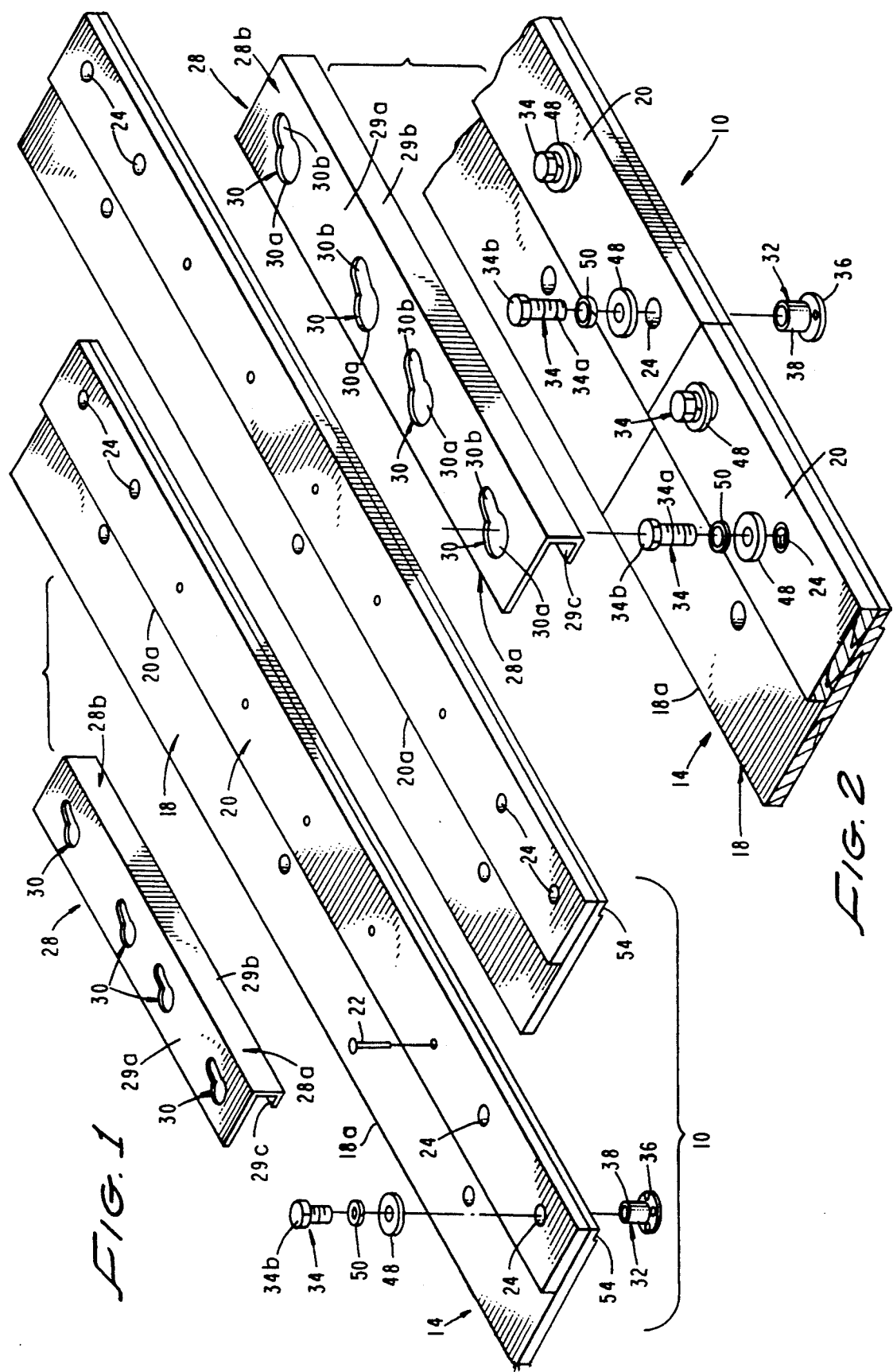

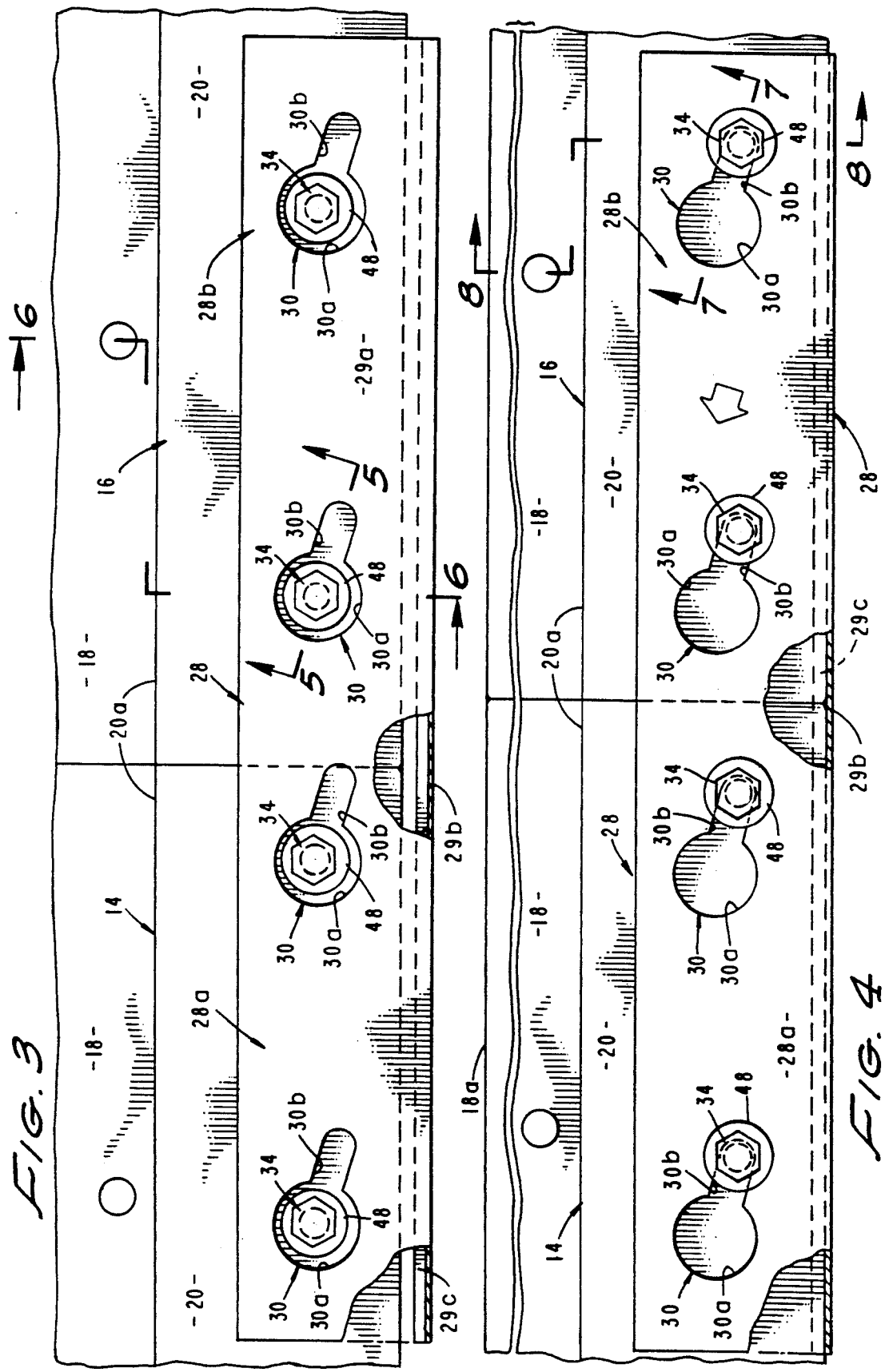

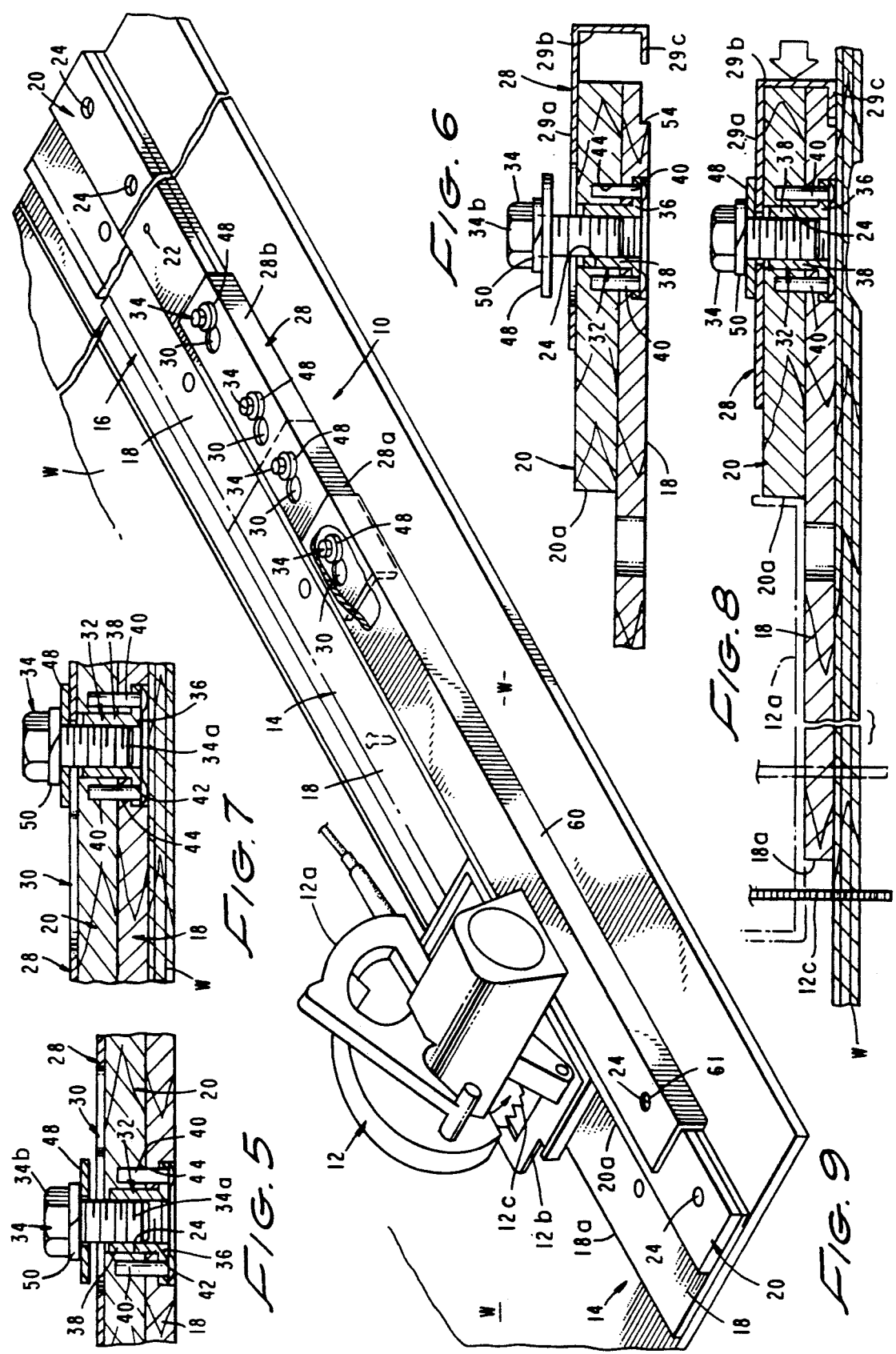

SAW GUIDE AND SURFACE PROTECTOR

BACKGROUND OF THE INVENTION

1. Field of the Invention

The present relates to power invention generally guides for tools. More particularly, the invention concerns a combination saw guide and surface protector for use in connection with power operated circular saws.

2. Discussion of the Invention

Hand operated power tools such as routers, circular saws and the like are widely used in the construction industry. Typically these tools include a subassembly comprising an electric motor and a handle and switch assembly mounted on a sole plate or base. In the typical power saw, a circular-shaped saw blade is connected to the spindle of the motor and typically extends through a slot provided in the sole plate.

Circular saws are used in the field for framing and the like and cuts are frequently made free hand. This is, the sole plate of the saw, which is usually provided is a guide notch, is placed on the workpiece to be cut and the line of cut is maintained in alignment with the guide notch as the saw is manually moved along a guide line inscribed on the workpiece. Generally this method of cutting, while not particularly accurate, is satisfactory for rough work. However, in certain instances, as for example, when cutting large sheets of plywood, wall paneling, and the like, greater accuracy is required. Such accuracy can be obtained using a table saw having a guide fence, but more often than not such saws are not available in the field and the hand operated circular saw must be used. This is undesirable not only because a true cut is most difficult to achieve, but also when finished paneling is being cut, the sole plate of the saw tends to damage the surface as it slides along the line of cut.

The apparatus of the present invention solves the problems discussed in the preceding paragraph and enables the circular saw to be used in the field to make precision cuts on large workpieces without damaging even the finest of surfaces. Further, the device of the invention enables even the starting apprentice to make precise cuts with a minimum of training.

SUMMARY OF THE INVENTION

It is an object of the present invention to provide an apparatus which can conveniently be used in the field with hand-operated power tools to make precise cuts in very large sheets of plywood paneling, wallboard and the like.

It is another object of the invention to provide an apparatus of the aforementioned character which includes a surface protector which prevents the soleplate of the tool from engaging and possible damaging the surface of the workpiece.

Another object of the invention is to provide a saw guide and surface protector apparatus for use with circular saws, which includes two or more sections that can be quickly and easily connected together to enable precision cuts to be made even on very large sheets of paneling and plywood.

Another object of the invention is to provide an apparatus of the character described which can be used by an unskilled workman with a minimum of training.

Still another object of the invention is to provide an apparatus as described in the preceding paragraphs which is safe and easy to use, is reliable and one which can be inexpensively manufactured in quantity.

BRIEF DESCRIPTION OF THE DRAWINGS

FIG. 1 is an exploded, generally perspective view of one form of the apparatus of the present invention.

FIG. 2 is an enlarged fragmentary, generally perspective view illustrating the details of construction of the connector assembly of the apparatus for interconnecting two lengths of the saw guide and surface protector.

FIG. 3 is an enlarged fragmentary plan view of the apparatus showing the connector plate in a first position.

FIG. 4 is an enlarged fragmentary plan view similar to FIG. 3, but illustrating movement of the connector plate of the connector assembly into a second bolt tightening position.

FIG. 5 is a cross-sectional view taken along lines 5—5 of FIG. 3.

FIG. 6 is a cross-sectional view taken along lines 6—6 of FIG. 3.

FIG. 7 is a cross-sectional view taken along lines 7—7 of FIG. 4.

FIG. 8 is a cross-sectional view taken along lines 8—8 of FIG. 4.

FIG. 9 is a generally perspective view of one form of the apparatus in use with a hand operated, power circular saw.

DESCRIPTION OF THE INVENTION

Referring to the drawings and particularly to FIGS. 1, 2 and 9, the guide apparatus 10 of the present invention is adapted to be used in connection with electrically powered tools such as a circular saw 12 of conventional construction having an electric motor and handle /switch subassembly 12a mounted on a sole plate 12b (FIG. 9). It is to be understood that, although the drawings show the use of the apparatus with a circular saw, it can be used with any power tool having a sole plate which can be guided along the guide member. In the form of the invention shown in the drawings, the apparatus includes first and second elongated guide assemblies 14 and 16 (FIG. 1), each comprising an elongated base 18 and an elongated guide member 20 which is connected thereto by any suitable means such as fasteners 22. Each of the guide assemblies is provided with two pair of strategically located, spaced-apart apertures 24, the purpose of which will presently be described.

The guide assemblies 14 and 16 are each about four feet in length so that when two of the guide assemblies are interconnected in the manner shown in FIG. 9, the apparatus will span about eight feet enabling it to be used in making a precision cut the full length of a standard eight foot wall panel or sheet of plywood. In a manner presently to be described, three or more guide assemblies can also be interconnected enabling the apparatus to be used in cutting 12 foot lengths of panels, wallboard or the like. Similarly, four or more guide assemblies can be interconnected if the size of the workpiece so demands.

The base 18 of each of the guide assemblies is preferably constructed from a strong, rigid fiberboard material having a smooth under surface. Using such a base material, the apparatus can be placed on top of workpieces, such as paneling, having a fine finish without fear of damaging the finish during the cutting operation. The guides 20 of the apparatus which are affixed to the upper surface of the base are preferably made from a reasonably hard wood or fiberboard having a longitudinally extending true edge suitable for accurately guiding travel of the sole plate of the circular saw during the cutting operation (FIG. 9).

A novel and important feature of the apparatus of the present invention resides in the design of the connector means for releasably interconnecting the guide assemblies of the apparatus in a manner such that the guide surfaces of the guide members are maintained in true alignment. In the embodiment of the invention shown in the drawings, the connector means comprises a rigid metal connector member 28 having first and second portions 28a and 28b. Member 28 can be constructed of steel, aluminum, or any other suitable material. As best seen in FIG. 9, portion 28a is receivable over one end of one of the guide assemblies and portion 28b is receivable over one end of the other guide assembly.

Turning to FIGS. 2 and 3, it can be seen that portions 28a and 28b of the connector member 28 are each provided with a pair of generally key shaped apertures 30. Each of the key hole apertures 30 comprises an enlarged diameter, generally circular shaped opening 30a and an elongated neck portion 30b in communication therewith. Apertures 30 are located so as to align with apertures 24 located in the end portions of the guide assemblies 14 and 16 in the manner indicated in FIGS. 2 and 3.

Receivable within the lower portion of each aperture 24 is an internally threaded fastening member 32 which is adapted to receive a threaded connector element, such as a bolt 34. As best seen in FIG. 5, each member 32 has a base portion 36 and a generally cylindrically shaped sleeve portion 38 which is closely receivable within a selected aperture 24. Each of the apertures 24 which extends through base members 18 is counterbored to closely receive base portion 36 of the members 32. Each member 32, which comprises a part of the connector means of the invention, is held in position within its respective aperture 24 by a pair of pins 40 which are closely receivable within drilled holes 42 provided in base portions 36 and within drilled holes 44 provided in the guide assemblies 14 and 16.

Also comprising a part of the connector means of the invention are the previously identified bolts 34 and their companion smooth washers 48 and lock washers 50. As shown in FIG. 2, bolts 34 include a threaded shank portion 34a and a hexagonally shaped head portion 34b which can be gripped by a suitable tightening device such as a wrench.

Turning to FIGS. 3 and 4, it is to be noted that apertures 30 are located so that when the connector member 28 is positioned over the end portions of the guide assemblies to be interconnected, portion 30a of each aperture will align with a bolt 34. Portions 30a of apertures 30 are of sufficient diameter to receive bolts 34 as well as washers 48 and 50. However, neck portions 30b of each aperture 30 are smaller in width than the diameter of washer 34b. Additionally neck portions 30b are configured so that movement of the connector member to the left from the position shown in FIG. 3 to the position shown in FIG. 4 will place the neck portions 30b directly below washers 48 (see also FIG. 7).

Referring to FIG. 6 it can be seen is that connector member 28 includes a top portion 29a, an edge portion 29b and a bottom portion 29c. As indicated in FIG. 8, when connector member 28 is moved to the second position also shown in FIG. 4, bottom portion 28c is received within an elongated groove 54 provided in each base 18 of each connector assembly.

In setting up the apparatus of the invention for use, the guide assemblies to be interconnected are first butted up in the manner shown in FIG. 2 of the drawings. Connector elements 34 are then loosely threaded into fastener members 38, which members have been previously affixed to the guide assemblies in the manner shown in FIG. 5. Next the connector member 28 is placed over the guide assemblies with bolts 34 and washers 48 protruding through apertures 30a respectively in the manner shown in FIGS. 3, 5 and 6. With the washers 48 in an elevated position (FIG. 6), connector member 28 is then moved into the position shown in FIGS. 4 and 8 by the exertion of a force on member 28 in the direction of the arrow of FIG. 8. This sliding movement of connector member 28 moves bottom wall 28c into groove 54 and at the same time positions connector elements, or bolts 34, within neck portions 30b of key hole shaped apertures 30. With member 28 in the position shown in FIG. 4, bolts 34 are tightened down against washers 48 which will engage the upper surface 29a of connector member 28 thereby holding the connector member securely in position.

Connector member 28 being of a rigid metal construction will precisely align guide assemblies 14 and 16 so that the electric circular saw 12 can be moved along base 18 in the manner shown in FIG. 9. By maintaining sole plate 12b of the circular saw in engagement with the inner edge 20a of guide 20 (FIGS. 8 and 9) the saw blade 12c will follow a precise, straight line path as it cuts the workpiece W in the manner illustrated in FIG. 9. It is to be noted that the width of the portion of base 18 between the guiding edge of guide 20 and the outer edge 18a of base 18 is preferably equal to the distance between saw blade 12c and the guiding edge of guide 20. In practice when the apparatus of the invention is sold to the user, base 18 is of a width such that it can be cut to size to accommodate the particular brand of circular saw owned by the user.

It is to be understood that a third guide assembly could be interconnected with the assembly shown in FIG. 9 through the use of a second connector member 28 which would be affixed to the end portions of guide assembly 14 and the end portions of the third guide assembly which would be butted up to the free end of guide assembly 14. When three or more guide assemblies are interconnected together, practice has shown that the use of a rigid metal reinforcing plate 60 of the character shown in FIG. 9 is advantageous. Reinforcing plate, or member, 60 is adapted to span the distance between portion 28a of the connector member shown in FIG. 9 and the corresponding portion of connector member 28 (not shown) which would be interconnected to the left end of guide assembly 14 as depicted in FIG. 9. Reinforcing member 60 is provided with drilled holes 61 proximate each of its ends that align with the outboard apertures 24 in the guide assemblies to be interconnected. (Shown as 24a in FIG. 9). Member 60 is connected to the guide assemblies by loosening the out-board bolts 34 placing the reinforcing member over the out-board portions of the adjacent connector members 28 and then reinserting and tightening bolts 34 so as to clamp the ends of the reinforcing member 60 to each end of the adjacent connector members 28. With reinforcing member 60 spanning the end portions of the adjacent connector members 28, a substantial degree of rigidity s imparted to the entire assembly thereby preserving the integrity of the assembly during transport and storage. It is to be understood that, depending upon the use to be made of the apparatus, the reinforcing member 60 might not always be required and certainly is not necessary to the successful use of the apparatus of the invention as described in the preceding paragraphs.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A saw guide apparatus for use in connection with an electrically powered circular was having a sole plate for cutting large sheets of materials, said apparatus comprising:
   (a) first and second elongated guide assemblies each comprising:
      (i) a base, having a first width and an aperture;
      (ii) a guide affixed to said base in an overlaying relationship, said guide having a second width less than said first width and an aperture aligned with said aperture in said base and further including a guide surface engageable by the sole plate of the saw;
   (b) connector means for releasably interconnecting said first and second guide assemblies so that said guide surfaces of said guide are maintained in alignment, said connector means comprising:
      (i) a rigid connector member having first and second portions receivable over portions of said first and second guide assemblies, said connector member having a top portion, an edge portion and a bottom portion, a portion of said base and said guide of each said guide assemblies being receivable intermediate said top and bottom portion of said connector member; and
      (ii) connector elements receivable within said aperture in said first and second guide assemblies for releasably connecting said connector member to said first and second guide assemblies.

2. A guide apparatus as defined in claim 1 in which said connector member is provided with a plurality of spaced-apart, key-hole shaped apertures indexable with said apertures in said first and second guide assemblies and in which said connector elements are receivable through said apertures in said connector member.

3. A guide apparatus as defined in claim 1 in which said connector means further includes internally threaded members receivable within said apertures provided in said first and second guide assemblies, said connector elements being threadably connectable with said threaded members.

4. A guide apparatus as defined in claim 1 in which each of said bases of said first and second guide assemblies is provided with an elongated groove and in which said bottom portion of said connector member is receivable within said elongated groove.

5. A guide apparatus as defined in claim 1 further including a third guide assembly and second connector means for interconnecting said third guide assembly to one of said first and second guide assemblies, said connector means comprising a top portion, an edge portion and a bottom portion.

6. A guide apparatus as defined in claim 5 further including an elongated rigid reinforcing member extending between said connector means connecting said first and second guide assemblies and said second connector means.

7. A guide apparatus as defined in claim 6 in which said reinforcing member includes a top portion, an edge portion and a bottom portion.

8. A guide apparatus for use in connection with an electrically powered cutting tool having a sole plate for cutting large sheets of material, said apparatus comprising:
   (a) first and second elongated guide assemblies each comprising:
      (i) a base, having a first width and a plurality of apertures;
      (ii) a guide affixed to said base in an overlaying relationship, said guide having a second width less than said first width and apertures aligned with said apertures in said base and further including a guide surface engageable by the sole plate of the cutting tool;
   (b) connector means for releasably interconnecting said first and second guide assemblies so that said guide surfaces of said guide are maintained in alignment, said connector means comprising:
      (i) a rigid connector member having first and second portions receivable over portions of said first and second guide assemblies, said connector member being generally "u" shaped in cross-section having a top portion, an edge portion and a bottom portion, a portion of said base and said guide of each said guide assemblies being receivable intermediate said top and bottom portion of said connector member; and
      (ii) connector elements receivable within said apertures in said first and second guide assemblies for releasably connecting said connector member to said first and second guide assemblies.

9. A guide apparatus as defined in claim 8 in which said connector means further includes connector elements receivable within said apertures in said first and second guide assemblies for releasably connecting said connector member to said first and second guide assemblies.

10. A guide apparatus as defined in claim 9 in which said connector member is provided with spaced apart apertures indexable with said apertures in said first and second guide assemblies and in which said connector elements are receivable through said apertures in said connector member.

11. A guide apparatus as defined in claim 10 in which said connector means further includes internally threaded members receivable within said apertures provided in said first and second guide assemblies, said connector elements being threadably connectable with said threaded members.

* * * * *